United States Patent [19]

Tonti et al.

[11] Patent Number: 4,939,234

[45] Date of Patent: Jul. 3, 1990

[54] POLYMERIZATION OF LACTAM POLYISOCYANATE HAVING THE ISOCYANATE GROUPS BLOCKED WITH LACTAM

[75] Inventors: Sergio Tonti, Mistre; Piero Furlan, Treviso; Gianpiero Talamini; Roberto Pernice, both of Mestre, all of Italy

[73] Assignee: Montedipe, S.p.A., Milan, Italy

[21] Appl. No.: 295,397

[22] Filed: Jan. 10, 1989

[30] Foreign Application Priority Data

Jan. 11, 1988 [IT] Italy ................................ 19032 A/88

[51] Int. Cl.$^5$ ............................................. C08G 69/20
[52] U.S. Cl. .................................... 528/315; 528/312; 528/323; 528/326
[58] Field of Search ................ 528/315, 312, 323, 326

[56] References Cited

U.S. PATENT DOCUMENTS

| 3,366,608 | 1/1968 | Lincoln et al. | 528/315 |
| 4,191,819 | 3/1980 | Meyer et al. | 528/315 |
| 4,611,052 | 9/1986 | Vrinssen et al. | 528/315 |
| 4,614,792 | 9/1986 | Bongers et al. | 528/315 |

Primary Examiner—Harold D. Anderson
Attorney, Agent, or Firm—Stevens, Davis, Miller & Mosher

[57] ABSTRACT

Process of preparing modified polyamides endowed with improved mechanical properties, which process resides in polymerizing an ω-lactam in the presence of
  (a) a polyisocyanate having the isocyanate groups blocked by an ω-lactam,
  (b) a poly-oxy-alkylene-amine, and
  (c) an alkali metal catalyst.

A further object of the invention is the products obtained by means of such a process.

16 Claims, No Drawings

POLYMERIZATION OF LACTAM POLYISOCYANATE HAVING THE ISOCYANATE GROUPS BLOCKED WITH LACTAM

The invention relates to the preparation of modified polyamides, endowed with improved mechanical properties, such as a high impact strength, both at room temperature and at lower temperatures, and good color indexes.

The possibility of preparing modified polyamides endowed with good mechanical properties and short polymerization times, by using a functionalized elastomeric prepolymer, acting as a modifier, and a basic catalyst, (block copolymers with polyamidic blocks and flexible segment blocks being thus obtained), is already known from the state of the art.

European Patent No. 88 560, for instance, discloses a process for the preparation of impact-resistant polyamides, residing in polymerizing an $\omega$-lactam in the presence of an alkali metal catalyst and of reaction product of (a) a poly-functional co-catalyst and (b) a polyoxyalkyleneamine.

However, the products obtained by means of this process show an impact resistance not completely satisfactory, in particular at the low temperatures.

According to the present invention, modified polyamides endowed with a favorable combination of physical properties, namely:

a high impact resistance both at room temperature ($+23°$ C.) and at lower temperatures (e.g., at $-30°$ C.);

a sufficiently high flexural modulus;

a sufficiently neutral color, in order not to interfere with possible subsequently applied pains; can be prepared by means of a process consisting of a polymerization of an $\omega$-lactam in the presence of:

(a) a poly-isocyanate having the isocyanate groups blocked by an $\omega$-lactam;

(b) a poly-oxy-alkylene-amine having an amine functionality lower than three, (c) an alkali metal catalyst.

The poly-oxy-alkylene-amines according to the present invention have an amine functionality lower than 3, and preferably from 1.5 to 2.9, such poly-oxy-alkylene-amines can be prepared according to known methods, e.g. by amination with ammonia of the corresponding hydroxy-polyethers, and they can also be directly found on the market.

Particularly preferred are poly-oxy-propylene-diamines and poly-oxy-tetramethylene-diamine, and still more particularly preferred are the poly-oxy-propylene-diamines having a molecular weight from about 200 to about 4,000, such as, e.g., those compounds which are traded under the trade marks JEFFAMINE® D 2000 AND JEFFAMINE® D 4000. Also suitable for the purposes of the invention are the poly-oxy-propylene-amines having an amine functionality of about 2.5, and a molecular weight of about 5,000, which are traded under the trade mark JEFFAMINE® T 5000. The above cited commercial products are traded by the Texaco Chemical Company.

The poly-oxy-alkylene-amines according to the present invention are preferably used in amounts ranging from 1% to 40%, preferably from 5% to 30% by weight, on the total amount of the reactants.

The $\omega$-lactams used in the present invention can be selected from the following compounds: $\gamma$-butyrolactam, $\delta$-valerolactam, $\epsilon$-caprolactam, $\omega$-enantholactam, $\omega$-capryllactam, pryllactam, $\omega$-undecanolactam and $\omega$-lauryllactam, either taken individually, or in combination. $\epsilon$-Caprolactam and $\omega$-lauryllactam are being particularly preferred.

For the anionic polymerization of $\omega$-lactams, various types of catalyst are known, and used in catalytic amounts, such as lactamates, alkoxides, alkali-metal hydrides and alkaline-earth metal hydrides; however, sodium, potassium or magnesium-bromine lactamates are used, normally dissolved in the $\omega$-lactam. A solution containing 15-25% by weight of sodium or potassium lactamate in $\omega$-lactam is preferred in the process according to the present invention.

The catalyst amount may be from 0.2 to 2 mols per 100 mols of $\omega$-lactam, and preferably from 0.25 to 1.5 mols per 100 mols of $\omega$-lactam.

As the activators of the anionic polymerization of $\omega$-lactam, isocyanates are used, whose isocyanate groups are blocked with $\omega$-lactam (such as e.g. the ones disclosed hereinbelow), obtained by means of known methods.

Substances containing more than one isocyanate groups, suitable for the intended purpose, can be aliphatic, cycloaliphatic and aromatic di- or polyisocyanates, such as hexamethylene-diisocyanate (HDI), trimethyl-hexamethylenediisocyanate (TMDI), the trimers of hexamethylene-diisocyanate, para-phenylene-diisocyanate (PPDI), toluene-diisocyanate (TDI), methylene-bis-phenyl-isocyanate (MDI) and its polymers (PMDI); naphthalene)diisocyanate (NDI), 1,4-dicyclohexyl-diisocyanate (CHDI), 1,4-bis-(isocyanatomethyl)cyclohexane ($H_6XDI$), isophorone-diisocyanate, hydrogenated MDI, 3,3'-dimethyl-4,4'-diphenylene-diisocyanate, and their mixtures.

Preferably, hexamethylene-diisocyanate (HDI) is used, (but equivalent results can be obtained with triethyl-hexamethylene-diisocyanate (TMDI)) in a variable amount, such that the concentration of NCO active groups is from 0.2 to 10 equivalents per 100 mols of $\omega$-lactam, and preferably of from 1 to 7 mols.

The concentration of activator to be used is proportional to the amount of poly-oxy-alkylene-amine, and is such that the total concentration of the active function (number of NCO equivalents) is at least equal to the total concentration of $NH_2$ groups present in the system.

In general, the ratio of the number of NCO equivalents to $NH_2$ equivalents is higher than 1 and preferably from 1.05 to 2.

Depending on the ratio of the initiator to the modifier, and or the operative conditions, a copolymer can be obtained, which has a structure consisting of repeating blocks (polyamide-6 and elastomeric segment), or a product can be obtained, which consists of a mixture of homopolymer and copolymer with alternating repeating segments.

When the $NCO/NH_2$ ratio is higher than 1, the improvement in the physical properties of the resulting polymer was observed on an experimental basis.

With a ratio higher than 1.5, an impact resistance is obtained, which is considerably higher than of the one of the polaymide homopolymer (with 20% of JEFFAMINE® D 2000, the value of the Izod Resilience with notch is higher than 500 J/m), without any substantial decrease in the value of the flexural modulus (>1000 MPa).

In general, the products obtained by means of the process according to the present invention display extremely good characteristics of color, in that they show a yellow index, as determined according to ASTM D 1925-70, not higher than −15.

When the present invention is exploited, the components of the formulation are preferably admixed with each other, and are then melted in order to fill the mold inside which the polymerization takes place.

The components are preferably distributed inside two melting vessels, one of such melting vessels containing a portion of the ω-lactam and the activator, and the other containing the balance of the ω-lactam and the catalyst.

The poly-oxy-alkylene-amine can be indifferently charged to either one of the vessels, according to the preferred method for carrying out the process, as hereinunder disclosed.

According to a first method, the polyisocyanate with blocked isocyanate groups, the ω-lactam and the poly-oxy-alkylene-amine are mixed and melted at a temperature not higher than 110° C., and to the thus obtained mixture, the catalyst in molten ω-lactam is added, whereafter the polymerization temperature is in crease up to a value not lower than 120° C.

According to a second method, to the polyisocyanate with blocked polyisocyanate groups, dissolved in molten ω-lactam, a mixture of the poly-oxy-alkylene-amine with the molten ω-lactam and with the alkali metal catalyst is added at a temperature not higher than 110° C., whereafter the polymerization temperature is increased up to a value not lower than 120° C.

The melting temperature can be from 75° C. to 110° C.

Both streams leaving the vessels are metered by means of a suitable metering device, are mixed with each other in the desired ratios, and then constitute the feedstock to the mold. The polymerization takes place, inside the same mold, at a temperature from 120° to 250° C., and more preferably from 130° C. to 160° C., within a few minutes. If the process is carried out at a temperature lower than the polyamide softening temperature, the formed polymer can be easily extracted from the mold, as an already finished article.

The polymerization process can be carried out in the presence of reinforcing agents, such as fiberglass, with fibers of various size, fabrics or mineral fillers, which behave as inert substances and do not interfere with the polymerization.

The use of fiberglass may prove advantageous when one desires to increase the rigidity of the manufactured article.

The present formulations are particularly suitable for obtaining a wide range of manufactured articles, such as flat sheets of different thickness, semifinished articles, solid articles with various shapes, rods, tubes, tanks, miscellaneous articles in general.

In particular, the present formulations are suitable for obtaining flat parts, or anyway parts showing a large linear development, of car bodyworks, by casting, by means of the RIM (Reaction Injection Molding) technology, or by rotational molding.

In order to better understand the present invention, and to reduce it to practice, in the following some illustrative examples are supplied, which by no way should be regarded as being limitative of the same invention.

EXAMPLE 1

To a jacketed vessel, heated at 100° C., equipped with stirring means and bottom drain, 223.43 g of caprolactam (CPL), 5.43 g of catalyst [Na-caprolactamate (Na-CPL) at 20% in CPL], and 12.64 g of JEFFAMINE ® D 2000 are melted under a nitrogen blanket. When the temperature of 100° C. is reached, still under a nitrogen blanket, 8.50 g of activator (caprolactam - blocked hexamethylene-diisocyanate at 33% in caprolactam) is added to the mixture, and 2 minutes later a flat mold of 210×210×3.5 mm, pre-heated at 156° C., is filled.

After 3 minutes and 25 s, the mixture has polymerized and the mold is opened.

A polymer is obtained, the impact resistance of which (Izod method with notch, ASTM D256) at 23° C. is 68 J/m, and the flexural modulus (ASTM D790) of which is 2,910 MPa, both of said characteristics being determined on the dry product.

EXAMPLES 2-6

Example 1 was repeated by replacing JEFFAMINE ® D 2000 by the ones reported in Table 1, which furthermore shows the compositions of the formulations, the polymerization times, and the mechanical characteristics of the polymer.

EXAMPLES 7-12

By operating according to Example 1, tests of polymerization in the presence of variable amounts of JEFFAMINE ® D 2000 were carried out, using Na-caprolactamate (NaCPL) at 20% in CPL and K-caprolactamate (K-CPL) at 16% in CPL as the catalyst; hexamethylene-diisocyanate at 33% in CPL was used as the activator.

The formulations, the operative conditions and the mechanical characteristics of the polymer are summarized in Table 2.

EXAMPLES 13-15

Example 1 was repeated working at a melting and mixing temperature of 90° C. and at a polymerization temperature of 150° C., the molar concentrations of Na-caprolactamate (Na-CPL) at 20% in CPL and of JEFFAMINE ® D 2000 were the same, but the concentration of hexamethylene-diisocyanate at 33% in CPL (as the activator) was changed.

The data and the relevant results are summarized in Table 3.

For examples 9, 10 and 15, measurements of yellow index according to ASTM D 1925-70 were carried out.

The lower the value of yellow index, the more "white with a blue shade" the product. For comparison purposes, polyamide-6 without JEFFAMINE ® has a yellow index of about +6. The results are respectively summarized in Table 2 and in Table 3.

EXAMPLES 16-20

By working according to Example 1, in Examples 16-19 various reaction parameters were changed and in Example 20 tri-methyl-hexamethylene-diisocyanate (TMDI) was used as the activator. The formulations, the polymerization times and the mechanical characteristics of the polymers are summarized in Table 4.

TABLE 1

| EXAMPLE | 1 | 2 | 3 | 4 | 5 | 6 |
|---|---|---|---|---|---|---|
| CAPROLACTAM (CPL), % by weight | 89.37 | 83.34 | 90.61 | 84.49 | 90.61 | 84.48 |
| Na-CPL (20% IN CPL), % by weight | 2.17 | 2.17 | 2.17 | 2.17 | 2.17 | 2.17 |
| ACTIVATOR (HDI AT 33% IN CPL)[1], % by weight | 3.40 | 4.39 | 2.16 | 3.24 | 2.16 | 3.24 |
| JEFFAMINE D 2000 (functionality 1.9), % by weight | 5.06 | 10.10 | | | | |
| JEFFAMINE D 4000 (functionality 1.76), % by weight | | | 5.06 | 10.10 | | |
| JEFFAMINE T 5000 (functionality 2.25), % by weight | | | | | 5.06 | 10.10 |
| MIXER TEMPERATURE, °C. | 100 | 100 | 100 | 100 | 100 | 100 |
| MOULD TEMPERATURE, °C. | 156 | 156 | 156 | 156 | 156 | 156 |
| MOULD OPENING TIME | 3' 25 s | 6' 05 s | 3' 50 s | 4' | 5' | 5' 10 s |
| IMPACT RESISTANCE, IZOD METHOD, WITH NOTCH, ASTM D 256, T = 23° C., DRY PRODUCT J/m | 68 | 122 | 118 | 109 | 125 | 131 |
| FLEXURAL MODULUS, ASTM D 790, DRY PRODUCT MPa | 2910 | 2384 | 2496 | 1724 | 2929 | 2042 |

[1]The concentration is concerning HDI with non-blocked isocyanic groups.

TABLE 2

| EXAMPLE | | 7 | 8 | 9 | 10 | 11 | 12 |
|---|---|---|---|---|---|---|---|
| CAPROLACTAM (CPL), | % by weight | 71 | 68.2 | 65.3 | 59.8 | 54.2 | 62.9 |
| Na-CPL (20% IN CPL), | % by weight | 6.5 | 6.3 | 6.0 | 5.6 | 5.2 | |
| K-CPL (16% IN CPL), | % by weight | | | | | | 8.4 |
| ACTIVATOR (HDI AT 33% IN CPL)[1], | % by weight | 7.5 | 8 | 8.7 | 9.6 | 10.6 | 8.7 |
| JEFFAMINE D 2000 (functionality 1.9), | % by weight | 15 | 17.5 | 20 | 25 | 30 | 20 |
| MIXER TEMPERATURE, | °C. | 90 | 90 | 90 | 90 | 90 | 90 |
| MOULD TEMPERATURE, | °C. | 150 | 150 | 156 | 150 | 150 | 156 |
| MOULD OPENING TIME | | 3' | 2' 45 s | 4' 55 s | 6' | 11' | 3' 20 s |
| IMPACT RESISTANCE, IZOD METHOD, WITH NOTCH, ASTM D 256, DRY PRODUCT T = +23° C., | J/m | 122 | 686 | 705 | 523 | 587 | 357 |
| T = −30° C., | J/m | | | 187 | | | 133 |
| FLEXURAL MODULUS, ASTM D 790, DRY PRODUCT | MPa | 1992 | 1536 | 1070 | 1010 | 712 | 1006 |
| YELLOW INDEX, ASTM D 1925-70 | | | | | −17.3 | −16 | |

[1]The concentration is concerning HDI with non-blocked isocyanic groups.

TABLE 3

| Example | | 13 | 14 | 15 |
|---|---|---|---|---|
| CAPROLACTAM (CPL), | % by weight | 67.2 | 66.3 | 65.3 |
| Na-CPL (20% AT IN CPL), | % by weight | 6 | 6 | 6 |
| ACTIVATOR (HDI AT 33% IN CPL)[1], | % by weight | 6.8 | 7.7 | 8.7 |
| JEFFAMINE D 2000 (functionality 1.9), | % by weight | 20 | 20 | 20 |
| MIXER TEMPERATURE, | °C. | 90 | 90 | 90 |
| MOULD TEMPERATURE, | °C. | 150 | 150 | 150 |
| MOULD OPENING TIME | | 3' 10 s | 3' 05 s | 3' |
| IMPACT RESISTANCE, IZOD METHOD WITH NOTCH, ASTM D 256 DRY PROOUCT +23° C., | J/m | 463 | 555 | 727 |
| FLEXURAL MODULUS; ASTM D 790 (DRY PRODUCT) | MPa | 683 | 1055 | 1083 |
| YELLOW INDEX; ASTM D 1925-70 | | — | — | −15 |

[1]See Table 4.

TABLE 4

| EXAMPLE | | 16 | 17 | 18 | 19 | 20 |
|---|---|---|---|---|---|---|
| CAPROLACTAM (CPL), | % by weight | 65.3 | 65.3 | 65.3 | 59.8 | 59.7 |
| Na-CPL (20% AT IN CPL), | % by weight | 6 | 6 | 6 | 5.6 | 6 |
| ACTIVATOR (HDI AT 33% IN CPL)[1], | % by weight | 8.7 | 8.7 | 8.7 | 9.6 | |
| ACTIVATOR (TMDI AT 25% IN CPL)[2], | % by weight | | | | | 14.3 |
| JEFFAMINE D 2000 (functionality 1.9), | % by weight | 20 | 20 | 20 | 25 | 20 |
| MIXER TEMPERATURE, | °C. | 90 | 90 | 90 | 90 | 90 |
| MOULD TEMPERATURE, | °C. | 150 | 140 | 160 | 140 | 150 |
| MOULD OPENING TIME | | 2' 20 s | 2' 30 s | 5' | 4' 30 s | 2' 30 s |
| IMPACT RESISTANCE, IZOD METHOD, WITH NOTCH, ASTM D 256, t = +23° C., DRY PRODUCT | J/m | 191 | 220 | 713 | 538 | 838 |
| FLEXURAL MODULUS, ASTM D 790, DRY PRODUCT | MPa | 894 | 1308 | 1467 | 734 | 1333 |

[1]The concentration is concerning HDI with non-blocked isocyanic groups.
[2]The concentration is concerning TMDI with non-blocked isocyanic groups.

What we claim is:

A process of preparing an impact—resistant polyamide, Comprising polymeriging an W-lactam in the presence of:
- (a) poly-isocyanate with the isocyanate groups blocked with an ω-lactam;
- (b) a poly-oxy-alkylene-amine having an amine functionality lower than three; and
- (c) an alkali metal catalyst.

2. A process according to claim 1, wherein the poly-isocyanate with the blocked isocyanate groups, the ω-lactam and the poly-oxy-alkylene-amine are mixed and melted at a temperature not higher than 110° C., and wherein the so-obtained mixture, the alkali metal catalyst in molten ω-lactam is added, polymerization temperature being then increased up to value not lower than 120° C.

3. A process according to claim 1, wherein to the polyisocyanate with the blocked polyisocyanate groups dissolved in molten ω-lactam, a mixture of the poly-oxo-alkylene-amine with the molten ω-lactam and with the alkali metal catalyst is added at a temperature not higher than 110° C., whereafter polymerization temperature is increased up to a value not lower than 120° C.

4. A process according to claim 2 or 3, wherein mixing temperature is from 75° to 100° C., the polymerization temperature being from 120° to 250° C.

5. A process according to claims 1, 2 or 3, wherein said poly-oxy-amine is a compound having an amine functionality from 1.5 to 2.9.

6. A process according to claims 1, 2 or 3, wherein said poly-oxy-alkylene-amine is selected from the group consisting of poly-oxypropylene-diamine and a poly-oxytetramthylene-diamine.

7. A process according to claim 6, wherein the poly-oxypropylene-diamine has a molecular weight from about 200 to about 5,000.

8. A process according to claims 1, 2 or 3, wherein the amount of poly-oxy-alkylene-amine is from 1% to 40%, by weight, on the total amount of the reactants.

9. A process according to claims 1, 2 or 3, wherein the lactam is selected from the group consisting of: gamma-butyrolactam, delta-valerolactam, epsilon-caprolactam, omega-enantholactam, omega-capryllactam, omega-undecanolactam, omega-lauryllactam, and combinations thereof.

10. A process according to claim 9, wherein the omega-lactam is selected from the group consisting of epsilon-caprolactam, omega-lauryllactam and combinations thereof.

11. A process according to claims 1, 2 or 3, wherein the poly-isocyanate is selected from the group consisting of an aliphatic, cycloaliphatic, and aromatic diisocyanate and combinations thereof.

12. A process according to claim 11, wherein the polyisocyanate derives from an aliphatic or cycloaliphatic diisocyanate.

13. A process according to claim 11, wherein the polyisocyanate is a mixture of an aliphatic di-isocyanate and of an aromatic di-isocyanate.

14. A process according to claim 4, wherein the polymerization temperature is 130° to 160° C.

15. A process according to claim 8, wherein the amount of poly-oxy-alkylene-amine is from 5% to 30%.

16. A process according to claim 12, wherein the polyisocyanate derives from hexamethylene-diisocyanate (HDI), trimethyl-hexamethylene-diisocyanate (TMDI), or combinations thereof.

* * * * *